May 3, 1938.      G. BAUER      2,116,181
MANUFACTURE OF HYDRAULIC COUPLINGS
Filed Jan. 24, 1935
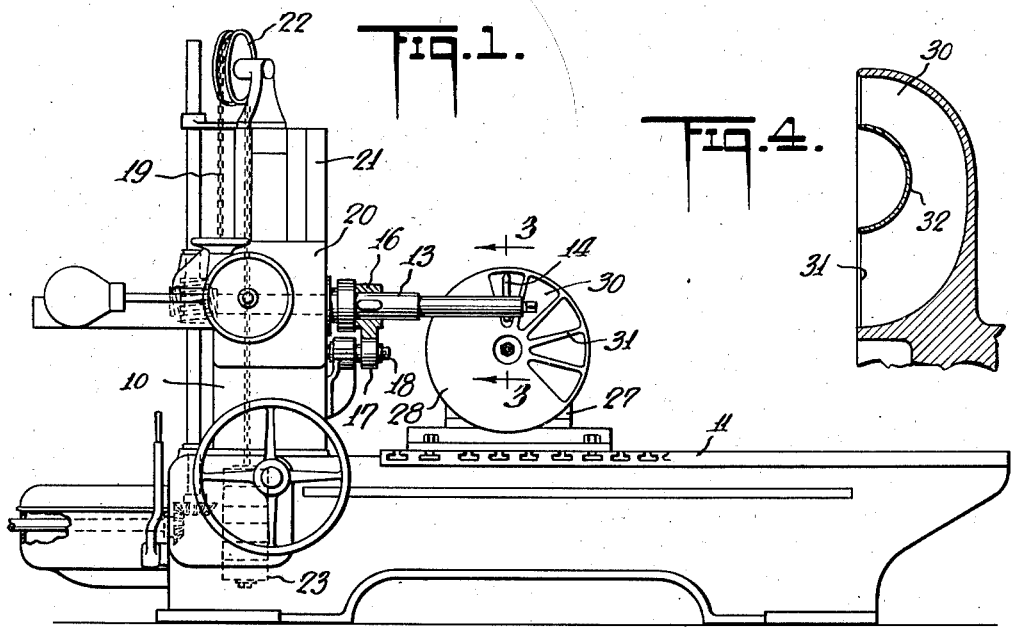
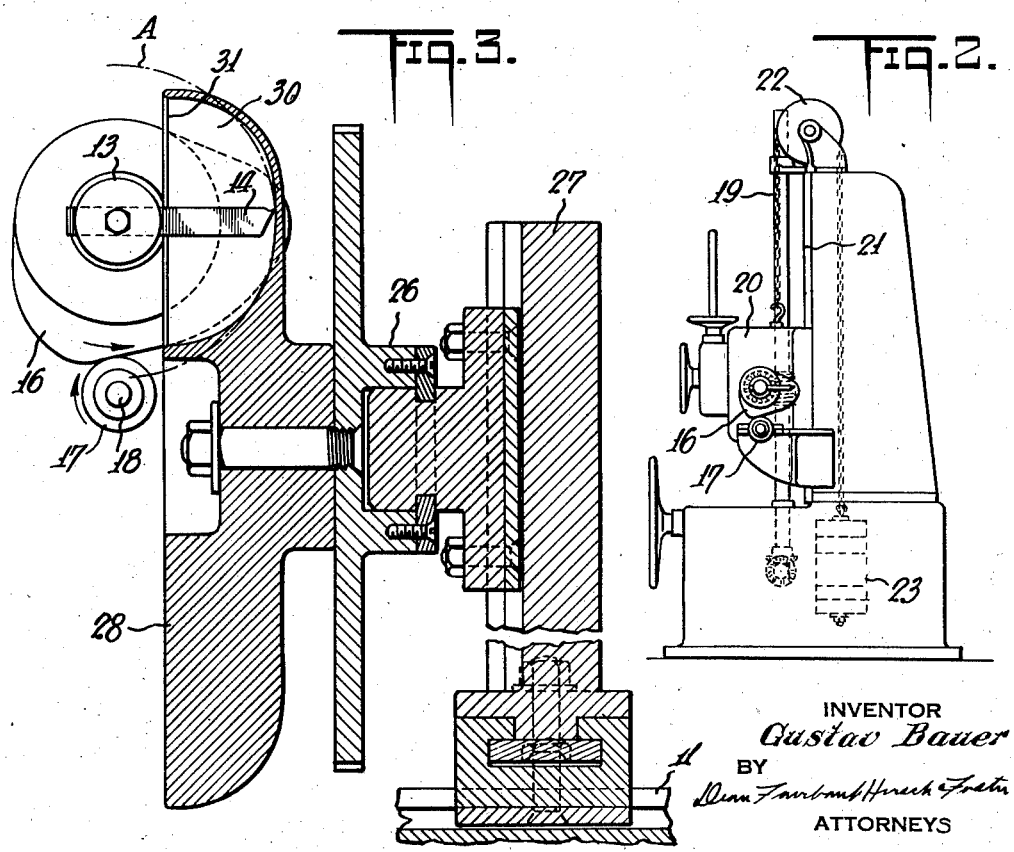
INVENTOR
*Gustav Bauer*
BY
ATTORNEYS Patented May 3, 1938

2,116,181

UNITED STATES PATENT OFFICE 2,116,181

MANUFACTURE OF HYDRAULIC COUPLINGS

Gustav Bauer, Hamburg, Germany

Application January 24, 1935, Serial No. 3,279
In France February 20, 1934

10 Claims. (Cl. 90—13.9)

A hydraulic coupling of the Fottinger type such as that shown in United States Letters Patent No. 1,199,359, comprises a driving rotor and a driven rotor, each of which is provided with an annular series of radial pockets open in an axial direction, and separated by radially extending vanes or blades, the two rotors being so designed and so juxtaposed that the impelling liquid circulating through the working chambers and between said vanes or blades, drives the driven rotor. The main wall of pockets is not ordinarily semi-circular in a radial plane, but is so shaped as to obtain the maximum efficiency for the speed and load for which the coupling is designed. Usually it has an oblong outline somewhat elliptical with the major axis extending radially. In each of these rotors there is generally included a substantially annular core or guide ring concentric with the axes of the rotors, and connected to said vanes intermediate of the radial ends thereof.

Hitherto, these rotors have been either cast or the parts have been assembled from sheet metal parts or metal castings. If the rotor be cast as one piece, the walls are necessarily thick and heavy, and the tensile strength of such a cast unit will be comparatively low. If the parts are made separately from sheet metal parts or metal castings, considerable expense and difficulty is encountered in the assembly and rigid connection of the various parts. The use of a cast iron coupling for certain purposes is limited because of low tensile strength, and if the coupling is built-up from sheet metal parts it is often too weak for certain operations, and parts may be distorted under the strains of use. None of the prior methods has been found practical for manufacturing a hydraulic coupling which may be used to transmit very large power at a very high speed and which may be subjected to great centrifugal and torsional stresses.

One object of the present invention is to provide a new and improved method for manufacturing hydraulic couplings of the Fottinger type.

Another object is to provide a method whereby each rotor of a hydraulic coupling may be machined as an integral unit from high strength materials. By means of this new and improved method it is possible to manufacture hydraulic couplings at low cost for all sizes used in practice, particularly those of small diameter, at the same time assuring the manufacture of a hydraulic coupling having great strength against distortion or cracking under centrifugal stresses.

A hydraulic coupling so manufactured may be used for various industrial purposes, for instance for motors and other vehicles, and may be used as part of the propelling machinery of naval craft. For naval purposes, the invention affords a great advantage in that the hydraulic coupling may be made of low weight and great strength, and permits the use of very strong material such as chrome nickel steel.

In carrying out my invention, each coupling half is made from a solid workpiece of steel partly forged into shape, the radial pockets and radial ribs or vanes being machined by a suitable milling tool. For that purpose, the milling tool not only rotates, but said tool and the work piece have an additional relative movement, so that said tool will mill out a pocket with the desired non-circular inner surface. This method permits not only the manufacture of a coupling with the working chamber walls of high strength material and low weight, but also permits the formation of the ribs or vanes integral with the chamber walls. Also, by means of this method of manufacture, the milling operation may be so controlled that the ribs may be formed thicker towards the hub so as to increase the resistance of the coupling sections against centrifugal force.

The annular core sections may be produced in the usual way substantially semi-circular in cross-section and welded to the ribs. This welding operation does not reduce the strength of the coupling since the radial ribs or vanes are integral with the casing or chamber wall, and are of substantial strength. Other auxiliary parts such as feeding or discharge pipes, may be welded or otherwise mounted in position. The complete coupling can then be annealed again after the core ring or other additional members have been welded into position.

A further object of the present invention is to provide an apparatus for carrying out my improved method.

Still another object is to provide, as a new article of manufacture, a hydraulic coupling of greater strength for its size and weight than has heretofore been known or used.

As one feature of my improved coupling, the ribs are so formed as to be thickest at their radially inner ends.

In the accompanying drawing:—

Fig. 1 is a somewhat diagrammatic elevational view of an apparatus embodying the present invention, and showing a work piece being machined in accordance with the method of the present invention, Fig. 2 is another view of the apparatus, Fig. 3 is a section taken on the line 3—3 of Fig. 1, but somewhat enlarged, and showing the milling tool in a different position, and Fig. 4 is a partial section of a finished rotor.

The apparatus illustrated includes a milling machine 10 having a tool spindle 13, at the end of which there is attached a milling tool 14. The spindle 13 is rotated by any suitable means, so that the tool moves about the axis of the spindle 13. As one feature of my invention, the spindle is, at the same time, also given a translatory movement in a direction at right angles to its axis, so that the cutting edge of the cutting tool 14 defines a path coincident with the non-circular but curved outline of the pockets desired to be formed in the coupling sections. For that purpose, there is provided a cam 16 which cooperates with a cam roller 17 and is rotated at the same angular speed as the spindle. Preferably, the cam 16 is secured to the spindle 13, and the roller 17 is rotated on a normally stationary stud shaft 18.

For permitting the vertical movement of the tool spindle 13 under the action of the cam 16, the spindle is mounted in a slide 20 which is vertically movable along a guide 21. The slide 20 is advantageously counterbalanced, and for that purpose, there is provided a chain 19 passing over a pulley 22 and having one end connected to the slide 20 and the other end may be connected to a drum which tends to rotate in a counterclockwise direction as viewed in Fig. 1, and under the action of a weighted arm, or may be connected to a weight 23. This arrangement serves not only to counterbalance the weight of the slide 20 and the attachments thereon so as to eliminate undue operating stresses, but also to render the vertical movement of the slide 20 smoother and easier.

For holding the work piece in position to be operated upon, there is provided a rotary table 26 of the ordinary type used in lathes or boring machines. This table 26 is supported to rotate about an axis on a carriage 27 which latter is movable lengthwise and crosswise in horizontal directions to the bed plate 11.

In carrying out my method, a work piece or blank 28 is formed as a solid circular piece forged roughly to the desired shape from very strong metal, such as chrome nickel steel. This work piece is centrally mounted on the rotary table 26, and the carriage 27 moved to the necessary operating position with respect to the cutting tool 14.

The combined rotary and translatory movement of the milling tool 14 causes it to cut out the radial pockets 30 in the solid work piece 28, the material remaining between successive pockets forming radial ribs or vanes 31. The adjustable or movable character of the rotary table 26 and the carriage 27 permits the work piece 28 to be moved intermittently in accordance with well known machine shop practice to mill out the pockets or recesses 30 individually and successively. The pockets formed will be bowl shaped and will each have a non-circular base contour in a radial plane, a true semi-circular outline being indicated by the dot and dash line A in Fig. 3. As shown, the width of the pocket in a radial direction is more than twice the maximum depth, so that when the two coupling sections or rotors are put together, the working chamber will have an oblong curved outline.

By a suitable movement of the carriage 27 and/or work piece 28, the pockets or recesses 30 will be made so narrow towards the center that the radial ribs 31 will be widest at their radially inner ends.

After the pockets 30 have been formed, sections 32 of the annular core ring may be inserted between the vanes or ribs and welded in position to the vanes 31, as shown in Fig. 4. The coupling so formed may then be annealed or re-annealed.

Although the tool 14, as shown, is moved vertically during the cutting stroke, as far as certain aspects of the present invention are concerned, the work piece itself may be moved during the cutting stroke to give the same effect.

The roller is shown below the cam. If the reaction of the tool on the work causes an upward thrust on the cam, the roller would be mounted above the cam.

Having thus described my invention, what I claim as new and desire to secure by Letters Patent is:—

1. A machine for forming an annular series of radial pockets in the face of a work piece to form a rotor of a hydraulic coupling, including a rotary table for supporting said work piece, a carriage for supporting said rotary table and movable horizontally in a direction at right angles to the tool holder, a tool holder rotatable about an axis parallel to the face of the work piece into which the tool cuts, a tool projecting radially therefrom, a cam on said tool holder, and a roller having a normally stationary axis parallel to said first mentioned axis and outside the periphery of said cam, and with which said cam engages to impart to said tool holder a movement at right angles to said face of the work piece during the cutting stroke, whereby the cutting edge of a tool on said tool holder will describe a non-circular path during its cutting stroke.

2. An apparatus for cutting radially disposed slots in a face of a work piece to form a rotor for a hydraulic coupling of the kinetic type, said apparatus including supporting means for the work piece permitting axial and intermittent rotational movement, a cutting tool, means for rotating said tool about an axis parallel to said face, and means for imparting to said tool to and fro movement in a direction at right angles to the axis of the tool and parallel to and radially of said face of the work piece, said two last mentioned means being so correlated that a single complete revolution of the tool is effected during a single to and fro movement thereof.

3. An apparatus for cutting radially disposed slots having approximately semi-elliptical inner surfaces in a face of a work piece to form a rotor for a hydraulic coupling of the kinetic type, said apparatus including supporting means for the work piece permitting axial and intermittent rotational movement, a tool holder having a radially extending cutting tool, means for rotating said tool about an axis parallel to said face of the work piece, and means for imparting to said tool to and fro movement in a direction at right angles to the axis of the tool and parallel to and radially of said face of the work piece.

4. A machine for forming an annular series of radial pockets in a work piece to form a rotor of a hydraulic coupling, including a rotary tool holder having a radially projecting cutting tool, means for rotating said tool holder about an axis parallel to the surface of the work piece into which the tool cuts, and separate means moving said tool holder to and fro in a direction at right angles to its axis, during each revolution thereof.

5. A machine for forming a radial pocket having a substantially semi-elliptical inner surface in a face of a work piece, including a cutting tool, means for rotating said cutting tool about an axis parallel to the surface of the work piece into which the tool cuts, and means for automatically and simultaneously imparting to said cutting tool a to and fro movement at right angles to its axis during each revolution of said cutting tool.

6. The method of cutting radially disposed slots having substantially semi-elliptical inner surfaces in a face of a work piece, including rotating a cutter about an axis parallel with and adjacent to said face of the work piece, moving the axis of said cutter to and fro in a direction radial to and parallel with said face along the length of a slot, the complete to and fro movement being effected during each complete rotation of the tool, and intermittently effecting relative movement of the work piece and cutter in the direction of the axis of the work piece and rotationally about the axis of the work piece.

7. The method of cutting radially disposed slots having substantially semi-elliptical inner surfaces in a face of a work piece to form a rotor for a hydraulic coupling of the kinetic type, including rotating a cutter about an axis parallel with and adjacent to said face of the work piece, moving the axis of said cutter to and fro in a direction radially to and parallel with said face of the work piece along the length of a slot.

8. The method of cutting a radial slot having a substantially semi-elliptical inner surface in an axially facing surface of a work piece, including moving a cutter substantially radially of the work piece, simultaneously rotating said cutter and intermittently effecting relative movement of the cutter and work piece axially of the latter.

9. The method of cutting radial slots having substantially semi-elliptical inner surfaces in a face of a work piece to form a rotor for a hydraulic coupling of the kinetic type, including rotating a cutter about an axis parallel to said face, moving the cutter in one direction along the length of the slot during the cutting part of each rotation, and moving it in the opposite direction during the non-cutting part of each rotation.

10. An apparatus for cutting radially disposed slots in a face of a work piece to form a rotor for a hydraulic coupling of the kinetic type, said apparatus including supporting means for the work piece permitting axial and intermittent rotational movement, a cutting tool, means for rotating said tool about an axis parallel to the surface of the work piece into which the tool cuts, and means for imparting to said tool to and fro movement in a direction parallel to and radially of said face of the work piece, said two last mentioned means being so correlated that a single complete revolution of the tool is effected during a single to and fro movement thereof.

GUSTAV BAUER.